United States Patent [19]

McNeely et al.

[11] Patent Number: 4,782,391

[45] Date of Patent: Nov. 1, 1988

[54] MULTIPLE INPUT DIGITAL VIDEO FEATURES PROCESSOR FOR TV SIGNALS

[75] Inventors: David L. McNeely; Donald H. Willis, both of Indianapolis, Ind.

[73] Assignee: RCA Licensing Corporation, Princeton, N.J.

[21] Appl. No.: 87,060

[22] Filed: Aug. 19, 1987

[51] Int. Cl.$^4$ ...................... H04N 5/262; H04N 5/272
[52] U.S. Cl. ...................................... 358/183; 358/22
[58] Field of Search ................. 358/183, 182, 22, 148, 358/150, 151

[56] References Cited

U.S. PATENT DOCUMENTS

| | | | |
|---|---|---|---|
| 3,911,368 | 10/1975 | Tarczy-Hornoch | 328/155 |
| 4,139,860 | 2/1979 | Micie | 358/22 |
| 4,635,097 | 1/1987 | Tatami | 358/13 |
| 4,636,515 | 4/1987 | Christopher | 358/183 |
| 4,673,983 | 6/1987 | Sarugaku et al. | 358/183 |

Primary Examiner—Tommy P. Chin
Attorney, Agent, or Firm—Paul J. Rasmussen; Eric P. Herrmann; Kenneth N. Nigon

[57] ABSTRACT

A video features processor for use with a display device includes a first clock that is line locked to the display and a skew-shifted second clock that is phase locked to the horizontal sync component of an auxiliary video signal. An A/D converter, responsive to the skew-shifted clock, develops digital samples representative of the auxiliary video signal. A clock transfer circuit, responsive to the line-locked and skew-shifted clocks, translates digital samples occurring synchronously with the skew-shifted clock signal to digital samples occurring synchronously with the line-locked clock signal. The digital samples occurring synchronously with the line-locked clock signal are stored in a memory.

10 Claims, 6 Drawing Sheets

MULTIPLE INPUT DIGITAL VIDEO FEATURES PROCESSOR FOR TV SIGNALS

This invention relates to a digital television (TV) signal processing system for simultaneously displaying a plurality of pictures on a single screen.

BACKGROUND

In recent years, there has been increasing interest in digital TV due to the greater availability of low cost digital hardware and memories. The digital TV allows the user to reformat the incoming video signals. For example, in a digital TV provided with a pix-in-pix feature, an auxiliary or secondary video signal SVS (e.q., from VCR tuner and IF circuits) defines a small picture on the display screen as an inset within a full picture defined by a main or primary video siqnal PVS (e.g., from TV tuner and IF circuits).

When either the primary or the secondary video signal is a nonstandard signal, timing or skew errors can occur in the displayed inset picture, which are manifested as jagged vertical edges. As used herein, a nonstandard signal is a video signal having a non-standard number of color subcarrier cycles in a horizontal period, and usually a non-constant or jittering horizontal period. Typical examples of non-standard signals are video signals generated by a video cassette recorder (VCR) or a video disc player (VDP). The cyclical variations in the horizontal line period (also known as time base errors) are typically caused by variations in the tape or disc speed.

The skew errors not only arise when one (or both) of the incoming video signals is (are) non-standard, but they can also arise when two standard video signals are received from two sources which are not synchronized with each other. This is so because the synchronizing signals, while within the tolerance limits of a particular signal standard (e.g., NTSC), have different frequencies, whereby the synchronizing signals precess in phase with respect to each other and can cause skew errors.

To understand how these timing or skew errors may affect the overlaid inset image, it is useful to know how the primary and secondary video signals PVS and SVS are processed in a typical pix-in-pix TV receiver. The secondary video signal SVS is sampled and digitized at instants determined by a sampling clock signal. The digital samples representing the secondary video signal SVS are then subsampled, both horizontally and vertically, to develop a stream of samples which represent a reduced size image. For example, for a 3-to-1 reduction in the picture size, every third sample and every third line is saved, and the intermediate samples and lines are discarded.

The digital samples taken during one field of the secondary video signal SVS are stored in a field memory. These samples are read out from the memory usinq a clock signal which is desirably related to the display deflection signal (e.g., horizontal synchronizing component of the primary video signal PVS). The samples read out from the memory are converted into an analog signal SVS' representative of the reduced-size secondary picture. A video switch, having input terminals coupled to receive the primary video signal PVS and reduced-size secondary video signals SVS', applies an appropriate one of the two input signals to a display device at each instant to produce a small picture within a large picture. U.S. Pat. No. 4,638,360 (Christopher et al.) entitled "TIMING CORRECTION FOR A PICTURE-IN-PICTURE TELEVISION SYSTEM" describes an illustrative pix-in-pix TV receiver, and a skew error correction system therefor.

The afore-mentioned Christopher et al. patent shows two embodiments of the pix-in-pix TV receiver. In one embodiment (FIG. 2), the sampling clock signal is locked to the color burst component of the secondary video signal SVS. In the second embodiment (FIG. 3), the sampling clock signal is locked to the color burst component of the primary video signal PVS. In both embodiments, the digital samples are corrected for skew errors: (1) before they are stored in the memory (to correct for skew errors caused by the variations in the horizontal line period of the secondary video signal SVS), and (2) after they are read out from the memory (to correct for skew errors caused by the variations in the horizontal line period of the primary video signal PVS).

SUMMARY OF INVENTION:

In accordance with this invention, the main or system clock signal FCS is locked in phase to the timing signal used for synchronizing the display deflection circuits. Means coupled to receive the main clock signal FCS, and responsive to the synchronizing component of the secondary video signal, generates a skew shifted clock signal SCS: (1) having a phase that is aligned with the phase of the synchronizing component of the secondary video signal SVS, and (2) having a period that is the same as that of the first clock signal FCS between successive phase adjustments. An analog-to-digital (A/D) converter converts the secondary video signal SVS into a stream of digital samples occurring synchronously with the skew shifted clock signal SVS. A clock transfer means, responsive to the main clock signal FCS and the skew shifted clock signal SCS, converts the stream of digital samples occurring synchronously with the skew shifted clock signal into a stream of digital samples occurring synchronously with the main clock signal. A memory, responsive to the main clock signal FCS, stores the digital samples and provides them, at an output port thereof, in synchronism with the main clock signal.

When the present invention is used for generating a small inset picture within a larqe main picture (e.g., in the pix-in-pix mode) the system clock signal FCS and the skew shifted clock signal SCS are both frequency divided by a reduction factor N. An A/D converter responsive to the reduced-rate skew-shifted clock signal SCS/N subsamples the secondary video signal. A clock transfer means, responsive to the reduced-rate clock signals SCS/N and FCS/N translates a stream of digital samples occurring at the SCS/N rate to a stream of digital samples occurring at the FCS/N rate.

The digital samples from the clock transfer means are written into the memory at the reduced FCS/N rate, but are read out from the memory at the full FCS rate. The digital samples from the memory are converted into an analog signal representative of the reduced-size secondary picture. A video switch, responsive to a fast switching signal FST and coupled to receive the primary video signal PVS and the analog signal SVS' representative of the reduced size secondary picture, applies an appropriate one of the two input signals to the display device to produce a small picture within a large picture.

Alternatively, it is possible to operate the A/D converter and the clock transfer circuit at the full clock rates FCS and SCN. In that case, the secondary video signal SVS is subsampled at the time it is stored in the memory. For example, for a 3-to-1 reduction (i.e., N=3) every third sample and every third line is stored, and the pixel and line addresses are incremented once every third sample and once every third line respectively.

In accordance with another aspect of the present invention, the concept of using two clocks—a main clock FCS locked to the display and a skew shifted second clock SCS locked to the synchronizing component of the secondary video signal—is used in a television receiver having a TV guide mode. In the TV guide mode, a number of channels (e.g., 9, 12, 16, etc.) are displayed simultaneously on the screen, so that the user can choose a program without having to flip through the TV channels one at a time.

In the TV guide mode, the second clock signal is successively locked in phase with the synchronizing components of the respective channels before the associated video signals are subsampled. The main or system clock signal, on the other hand, remains locked to the display deflection signals $HDS_D$ and $VDS_D$. The clock transfer means sequentially translates the digital samples occurring synchronously with the associated synchronizing components to a stream of digital samples occurring synchronously with the main clock signal. The translated digital samples are stored in a raster-mapped memory, and displayed on the screen to produce multiple pictures.

Pursuant to a still further aspect of the subject invention, the above technique is used for producing a fly's eye effect. In the fly's eye mode, the TV receiver displays a number of identical pictures (e.g., 9, 12, 16, etc.) on the screen. The pictures may be either identical or displaced in time by a field interval, but they are all produced from a single TV program. In this scheme, the main clock signal remains locked to the display, and the second clock signal is locked in phase to the synchronizing component of the channel that is displayed in the fly's eye mode.

IN THE DRAWINGS

DETAILED DESCRIPTION

Figure 1:
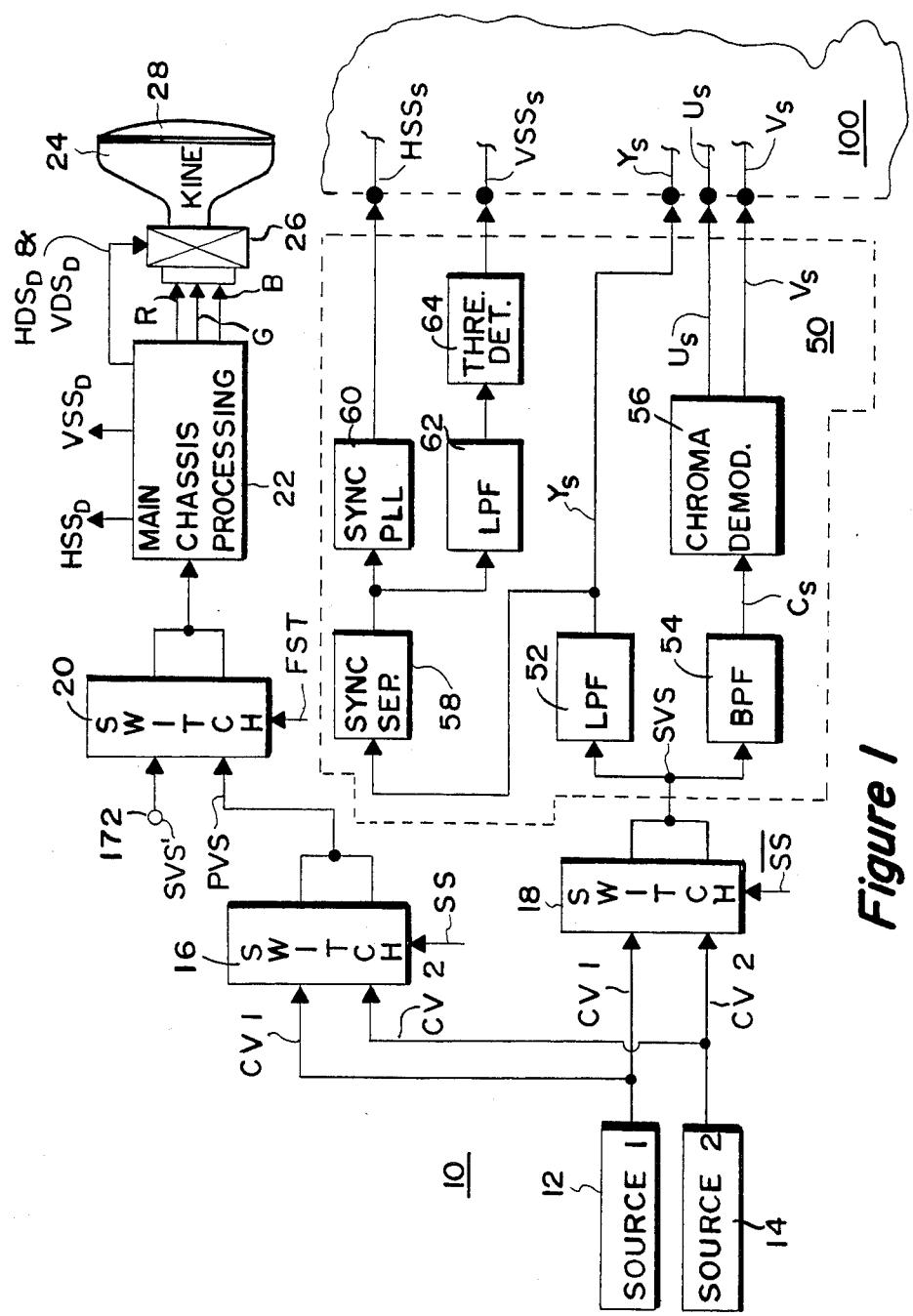
FIG. 1 illustrates a block diagram of a digital TV receiver including a portion of a video features processor in accordance with the principles of the present invention.

In the DRAWINGS, the lines interconnecting various blocks represent either single conductor connections carrying analog signals or buses carrying binary digital signals, as the case may be. A value next to the slash mark intercepting a particular interconnecting line represents the number of parallel connections of that line or bus and a value in the parenthesis represents the repetition rate of the samples.

It will be readily appreciated by those skilled in the TV signal processing art that the invention may be practiced on either digital or analog representations of the composite video signal. For the purposes of the detailed description, however, it will be assumed herein that the composite video signal is a binary digital signal.

It will be further assumed that the incoming video signal nominally conforms to the NTSC standard format. Examples of signals conforming nominally to the NTSC standard format are video signals produced by a video cassette recorder or a video disc player (hereinafter, non-standard video signals).

FIGURE 1 shows a memory-based TV receiver 10 for simultaneously processing video signals from two unrelated sources 12 and 14. The source 12 (e.g., TV antenna, tuner and IF circuits) provides a first baseband composite video signal CV1. The source 14 (e.g., VCR) develops a second baseband composite video signal CV2.

The first and second composite video signals CV1 and CV2 are each applied to a pair of electronic switches 16 and 18. The switch 16, responsive to a selection signal SS, selects one of the two input signals CV1 and CV2 (hereinafter referred to as the primary video signal PVS) for application to a first input terminal of a third electronic switch 20. The second switch 18, responsive to the inverted selection signal $\overline{SS}$, applies the other of the two input signals CV1 and CV2 (hereinafter referred to as the secondary or auxiliary video signal SVS) to an analog signal processor (ASP) 50.

As previously indicated, the primary video signal PVS develops a full size large picture on the TV screen, on which a reduced-size, small picture developed by the secondary video signal SVS is overlaid. The user decides which of the two incoming video signals CV1 and CV2 is used for defining the large picture. The other video signal is automatically used for generating the small picture. The control microprocessor (not shown) of the TV receiver 10 develops the selection signals SS and $\overline{SS}$ in response to the user command.

The analog signal processor 50 includes a lowpass filter 52 and a bandpass filter 54. The lowpass filter 52, having an upper cut-off frequency of about 1.5 MHz, passes luma signal (designated as a secondary luma signal $Y_s$) to the exclusion of chroma signal. As will be apparent later, the lowpass filter 52 additionally serves as an antialiasing filter in the horizontal direction. The bandpass filter 54, having a passband of approximately 3.58 MHz±0.5 MHz, recovers the chroma component $C_s$ from the secondary video signal SVS. A chroma demodulator 56, coupled to receive the chroma signal $C_s$, develops a pair of baseband color difference signals $U_s$ and $V_s$ (e.g., R−Y and B−Y). The circuits (e.g., LPF 52, etc.) in the block 50 are conventional, therefore, they are not described in detail.

The secondary luma signal $Y_s$ is applied to a sync separator 58 for extracting the horizontal and vertical sync pulses. The output of the sync separator 58 is provided to a sync phase locked loop (PLL) 60 to develop at an output thereof a secondary horizontal sync signal $HSS_s$. The sync PLL 60 enhances the noise immunity of the horizontal timing information recovered from the secondary video signal SVS.

The horizontal and vertical sync pulses at the output of the sync separator 58 are further applied to a lowpass filter 62 for providing at an output thereof only the vertical sync pulses to the exclusion of the horizontal sync pulses. The vertical sync pulses from the lowpass filter 62 are coupled to a threshold detector 64 to develop a secondary vertical sync signal $VSS_S$.

The output signals from the analog signal processing block 50 (i.e., $Y_S$, $U_S$, $HSS_S$ and $VSS_S$) are applied to a video features processor (VFP) 100 of the present invention. The analog output SVS' of the video features processor 100, representative of the reduced-size secondary picture, is coupled to the second input terminal of the video switch 20. As previously mentioned, the switch 20, responsive to the fast switching signal FST, applies an appropriate one of the two input signals PVS and SVS' to the signal processing circuits 22 of the TV receiver.

The signal processing circuits 22 develop red, green and blue drive signals from the composite video signal provided by the video switch 20. These signals are applied to the respective red, green and blue electron guns of a kinescope or display 24. The signal processing circuits 22 additionally recover a pair of horizontal and vertical deflection signals $HDS_D$ and $VDS_D$ from the primary video signal PVS for application to the horizontal and vertical deflection windings 26 of the display 24. The red, green and blue electron beams, responsive to the respective drive and deflection signals, scan a raster on the screen 28 to produce the desired small picture within a large picture.

Figure 2:
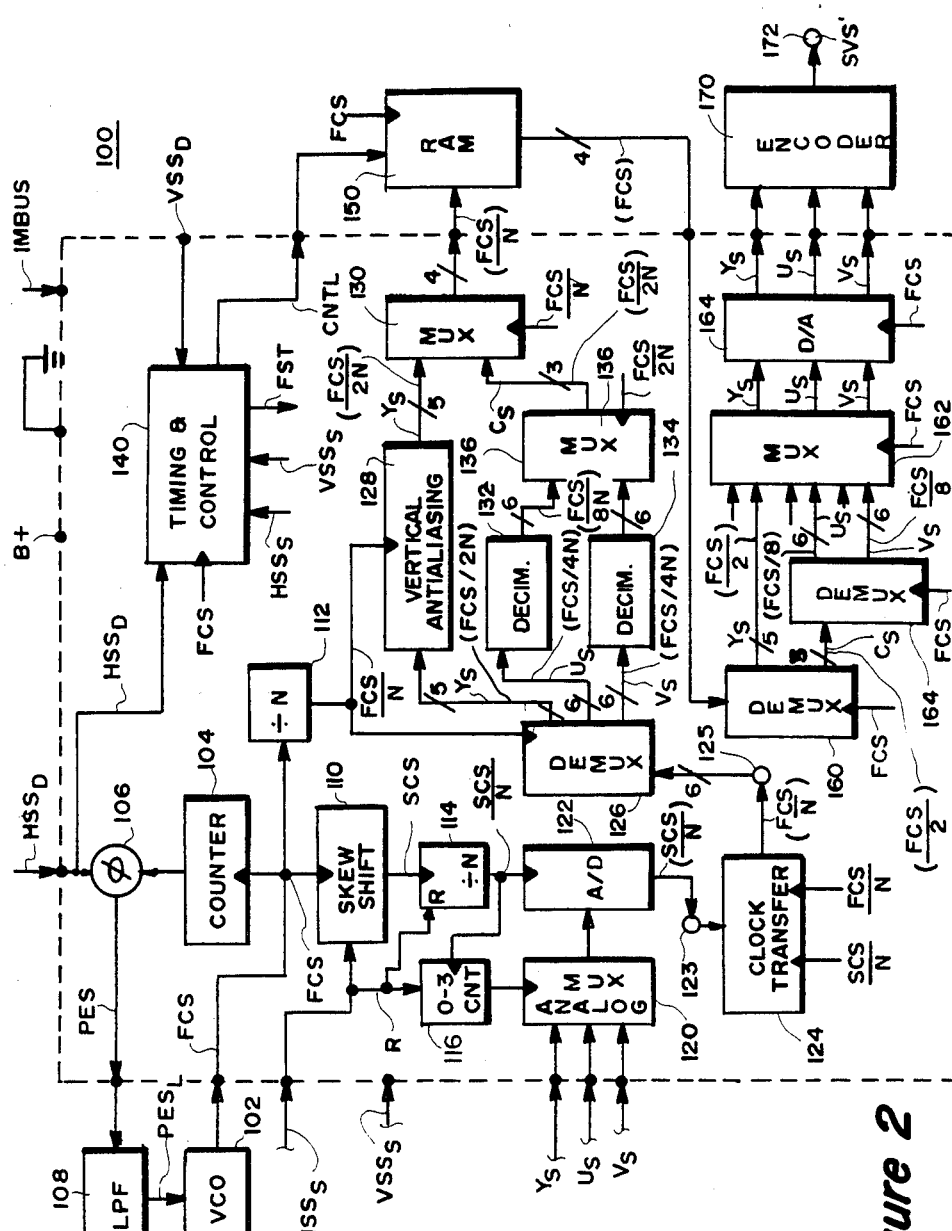
FIG. 2 depicts a detailed block diagram of the video features processor.

The construction and operation of the video features processor 100, incorporating the present invention, is now described in conjunction with FIG. 2. A voltage controlled oscillator (VCO) 102, responsive to a lowpass-filtered phase error signal $PES_L$, generates a first clock signal FCS, which is locked in phase and frequency to the horizontal sync component $HSS_D$ of the primary video signal PVS.

The nominal frequency of the first clock signal FCS is established at 1374 times the horizontal sync frequency $F_H$. In the NTSC system, the horizontal sync frequency $F_H$ is set at 2/455 times the color subcarrier frequency of 3.58 MHz. This, in turn, establishes $F_H$ at about 15.734 KHz and $F_{FCS}$ at about 21.6 MHz.

A counter 104 divides the first clock signal FCS by 1374 to generate a signal having a phase that is in alignment with the first clock signal FCS and having a frequency that is about equal to the frequency $F_H$ of the horizontal sync component $HSS_D$ of the primary video signal PVS. A phase detector 106 compares the phase of the signal at the output of the counter 104 with the phase of the display horizontal sync signal $HSS_D$ (which may be in the form of a flyback signal from the horizontal deflection circuits of the TV receiver) to develop a phase error signal PES. The phase error signal PES is lowpass filtered in a lowpass filter 108 to enhance its noise immunity, and to remove the input frequencies to the phase detector. The lowpass-filtered phase error signal $PES_L$ is applied to the voltage controlled oscillator 102 to develop the 21.6 MHz first clock signal FCS, which is locked in phase and frequency (i.e., line-locked) with the horizontal sync component $HSS_D$ of the primary video signal PVS.

As previously indicated, the video features processor 100 uses two clock signals: (1) a first clock signal FCS (also referred to as the main, system or line-locked clock signal) that is locked in phase and frequency to the display horizontal sync signal $HSS_D$, and (2) a second clock signal SCS (also referred to as the skew-shifted clock signal) having its phase shifted once every horizontal line to align with the phase of the horizontal sync component $HSS_S$ of the secondary video signal SVS, and having a period that is equal to that of the first clock signal FCS between successive phase adjustments.

To develop the skew shifted second clock signal SCS, the video features processor 100 is equipped with a skew or phase shifter 110. The skew shifter 110 delays the first clock signal FCS by differing amounts to generate a plurality of clock signals having differing phases, but all having the same period as the first clock signal. A detector (not shown), coupled to receive the aforesaid multiphase clock signals and responsive to the horizontal sync component $HSS_S$ of the secondary video signal SVS, selects the closest phase clock signal to the horizontal sync component $HSS_S$. U.S. Pat. No. 3,911,368 (Tarcy-Hornoch) shows a circuit arrangement that is suitable for use as a skew or phase shifter 110. U.S. patent application entitled "SIGNAL PHASE ALIGNMENT CIRCUITRY" and filed in behalf of McNeely on Aug. 7, 1987 describes an alternative arrangement for the phase shifter 110.

The line-locked clock signal FCS and the skew-shifted clock signal SCS are applied to the respective divide-by-N circuits 112 and 114 to generate a pair of reduced-rate clock signals FCS/N and SCS/N. In the pix-in-pix mode, the reduction factor N represents the reduction in size of the small inset picture, both in horizontal and vertical directions. Illustratively, the reduction factor N may assume any one of the integer values 1, 2, 3 ... 16. In the zoom mode, the reduction factor N is set at one, whereby the video signal stored in the memory is not subsampled.

The luma and chroma signals $Y_S$, $U_S$ and $V_S$ from the analog processor 50 are applied to the respective input terminals of an analog multiplexor (hereinafter mux) 120. The reduced-rate, second clock signal SCS/N is applied to a 0-to-3 counter 116, which generates a control signal for the analog mux 120. The analog mux 120 develops, at its output, a sequence of values Y, U, Y, V, Y, U ... at the reduced SCN/N rate. An analog-to-digital (A/D) converter 122, responsive to the reduced-rate, second clock signal SCS/N, translates the incoming sequence Y, U, Y, V, Y ... into a stream of 6-bit digital samples having corresponding values.

A clock transfer circuit 124, responsive to the reduced-rate, first and second clock signals FCS/N and SCS/N converts the stream of digital samples (Y, U, Y, V, Y ... ) occurring synchronously with the skew-shifted clock signal SCS (but at the SCS/N rate) to a stream of digital samples occurring synchronously with the line-locked clock signal FCS (at the FCS/N rate). The clock transfer circuit 124 will be described in detail later with the help of FIGS. 3–8.

A demultiplexor 126 responsive to the reduced-rate, line-locked clock signal FCS/N sorts out the stream of digital samples occurring at the FCS/N rate into three streams:

5-bit luma samples $Y_S$ occurring at the FCS/2N rate (the least significant bit (LSB) of the luma samples is discarded), 6-bit chroma samples $U_S$ occurring at the FCS/4N rate and representing one of the two color difference signals, and 6-bit chroma samples $V_S$ also occurring at the FCS/4N rate and representing the other of the two color difference signals.

The luma samples $Y_S$ are applied to a vertical antialiasing filter 128. The vertical antialiasing filter 128 limits the highest frequency of the luma signal in the vertical direction so as to reduce aliasing effects in the reduced-size inset picture. As previously indicated, the lowpass filter 52 of the analog processing block 50 limits the upper frequency of the luma signal $Y_S$ in the horizontal direction, thereby reducing the aliasing effects in the horizontal direction. The 5-bit luma samples $Y_S$ from the vertical antialiasing filter 128 are applied to a first input of a mux 130.

The 6-bit chroma samples $U_S$ and $V_S$ are applied to the respective decimators 132 and 134. The decimators 132 and 134 discard every other sample to produce chroma samples at the FCS/8N rate. The 6-bit decimated chroma samples $U_S$ and $V_S$ at the FCS/8N rate are applied to a mux 136. The mux 136 produces the following sequence of 3-bit words at the FCS/2N rate:
3 most significant bits (MSB's) of $U_S$,
3 least significant bits (LSB's) of $U_S$,
3 MSB's of $V_S$, and
3 LSB's of $V_S$, and so on.

The 3-bit output of the mux 136 is applied to the second input terminal of the mux 130. The mux 130, responsive to the FCS/N clock signal, produces the following 4-bit sequence at the FCS/N rate:
4 MSB's of $Y_S$,
LSB of $Y_S$ and 3 MSB's of $U_S$,
4 MSB's of $Y_S$,
LSB of $Y_S$ and 3 LSB's of $U_S$,
4 MSB's of $Y_S$,
LSB of $Y_S$ and 3 MSB's of $V_S$,
4 MSB's of $Y_S$, and
LSB of $Y_S$ and 3 LSB's of $V_S$, and so on.

The above 4-bit samples (4Y, 1Y+3U, 4Y, 1Y+3U, 4Y, 1Y+3V, 4Y, 1Y+3V ...) are applied to a video field memory 150, where they are stored in successive memory locations under the control of timing and control signal generator 140. The memory 150 has separate input and output ports and consists of a grid of 4-bit storage cells or locations, which are organized as rows and columns. There are a sufficient number of rows (e.g., $2^8$ or 256) and columns (e.g., $2^{10}$ or 1024) to hold one entire field of television signal (i.e., about $2^{18}$ 4-bit samples or nibbles).

The timing and control signal generator 140 provides a write address signal WAS and a read address signal RAS. The write address signal WAS includes a row address and a column address. The row address is reset once every field in response to the display vertical sync signal $VSS_D$, and is advanced once every N horizontal sync signal pulses $HSSP_D$, where N (1, 2, 3 ...) is the reduction factor. As indicated before, N is set equal to 1, 2, 3 ... in the pix-in-pix mode, and is set equal to 1 in the zoom mode.

The column address is reset once every horizontal line in response to the display horizontal sync signal $HSS_D$, and is advanced once every N pulses of the line-locked clock signal FCS. Thus, it will be seen that the digital samples representing the reduced-size inset picture (i.e., the subsampled secondary video signal) are stored at successive locations. For a 3-to-1 reduction, only one out of 3 successive pixels and one out of 3 successive horizontal lines are stored in the memory 150.

The 4-bit digital samples (4Y, 1Y+3U, 4Y, 1Y+3U, 4Y, 1Y+3V, 4Y, 1Y+3V ...) are read out from the memory 150 at appropriate times at the full FCS rate at the direction of the timing control signal generator 140. The read address signal RAS includes both a row address and a column address. The row address is reset once every field in response to the display vertical synchronizing signal $VSS_D$ and is advanced once every pulse of the display horizontal sync signal $HSS_D$. The column address is reset once every horizontal line in response to the display horizontal sync signal $HSS_D$, and is advanced once every pulse of the line-locked clock signal FCS.

The timing and control signal generator 140 (1) counts pulses of the display horizontal sync signal $HSS_D$ relative to every pulse of the display vertical sync signal $VSS_D$, and (2) counts pulses of the line-locked clock signal FCS relative to each pulse of the display horizontal sync signal $HSS_D$ to determine when to initiate the memory read operation in the pix-in-pix mode. This, in turn, locates the small inset picture at the desired position within the large picture.

Exemplary arrangements for generating the write and read addresses are described in U.S. Pat. No. 4,249,213, entitled "PICTURE-IN-PICTURE TELEVISION RECEIVER" and U.S. Pat. No. 4,139,860, entitled "TELEVISION RECEIVER EQUIPPED FOR SIMULTANEOUSLY SHOWING SEVERAL PROGRAMS".

A demultiplexor or demux 160 separates the 4-bit stream (4Y, 1Y+3U, 4Y, 1Y+3U, 4Y, 1Y+3V, 4Y, 1Y+3V ...) of digital samples at the full FSC rate into a stream of 5-bit luma samples occurring at the FCS/2 rate and a stream of 3-bit chroma samples (3U, 3U, 3V, 3V ...) also occurring at the FCS/2 rate. It is noted that the demux 160 and the mux 130 serve complementary functions. In other words, the format of the output streams $Y_s$ and $C_s$ of the demux 160 are the same (but delayed and sped up by N-to-1) as the format of the respective input streams $Y_s$ and $C_s$ to the mux 130.

The 5-bit output $Y_s$ of the demux 160 is applied to a first input terminal of a mux 162. The 3-bit output $C_s$ of the demux 160 is applied to a demux 164, which is complementary to the mux 136. The demux 164 recombines the 3-bit MSB's and LSB's of the $U_s$ and $V_s$ signals occurring at the FCS/2 rate to reconstruct the respective 6-bit $U_s$ and $V_s$ signals, each occurring at the FCS/8 rate. The 6-bit signals $U_s$ and $V_s$ are applied to the second and third terminal of the mux 162, respectively.

The mux 162 serves to insert the desired border and blanking signals into the respective luma and chroma signals $Y_s$, $U_s$ and $V_s$ at appropriate times. A digital-to-analog (D/A) converter 164 converts the digital luma and chroma signals $Y_s$, $U_s$ and $V_s$ into the respective analog equivalent signals. An encoder 170 translates the analog luma and chroma siqnals $Y_s$, $U_s$ and $V_s$ into a composite video siqnal in the NTSC format (representative of the reduced-size inset picture) for application to the video switch 20. As previously indicated, the video switch 20, responsive to a fast switching signal FST, applies the appropriate one of the two video signals—the primary video signal PVS and the subsampled secondary video signal SVS'—to the display 28 to produce a large picture with an inset image. A suitable device that can be employed as the encoder 170 is the integrated circuit HA11720 made by Hitachi.

Figure 3:
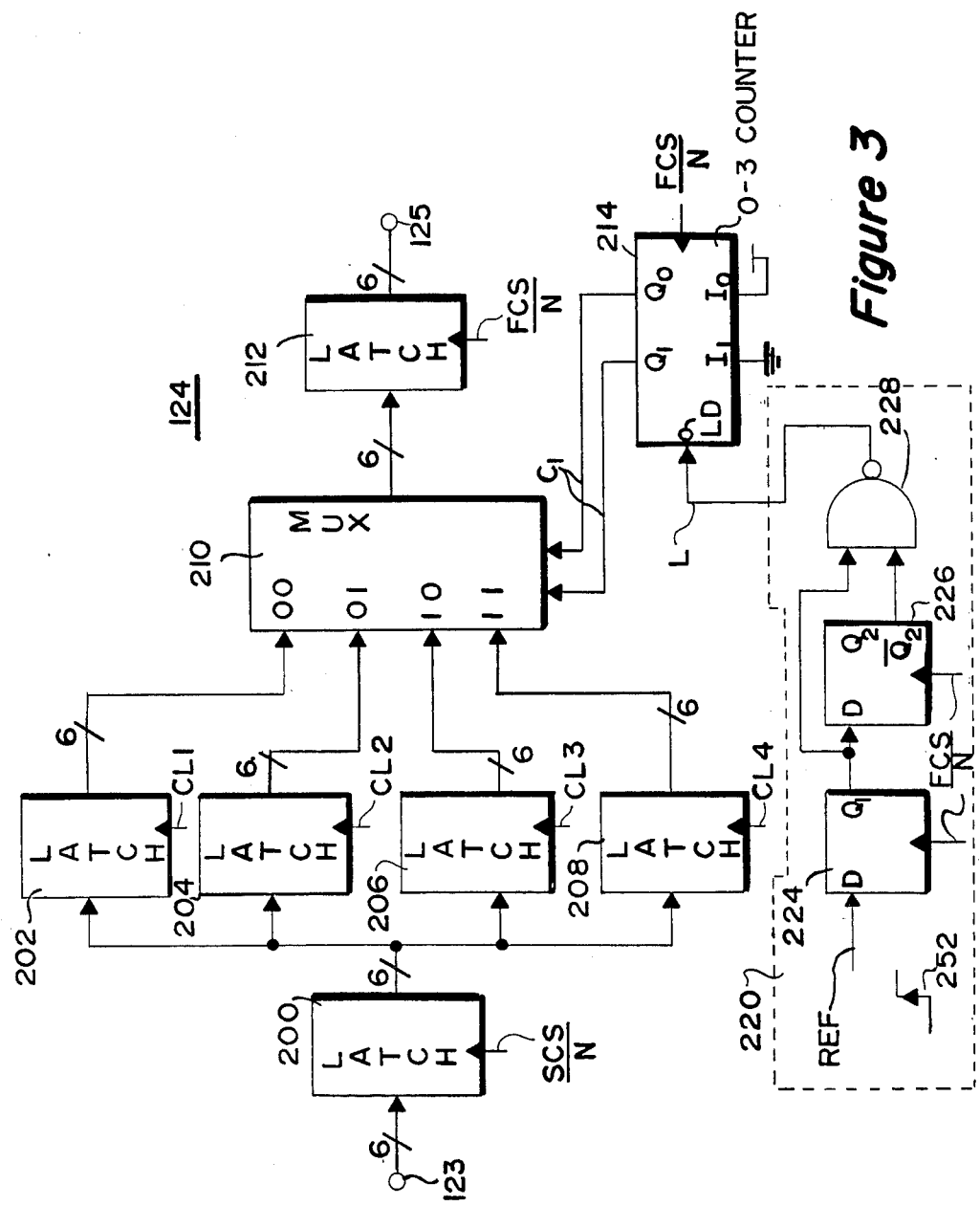
FIG. 3 shows a clock transfer circuit suitable for use with the FIG. 2 video features processor.
Figure 4:
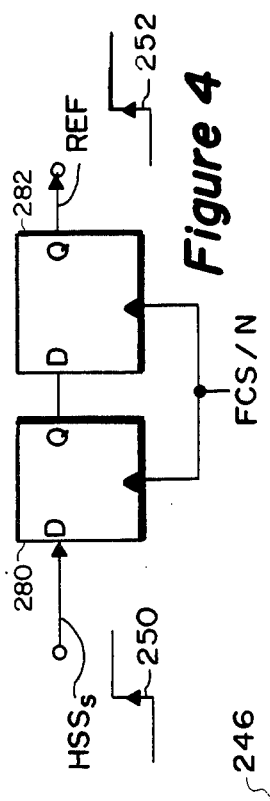
FIG. 4 illustrates a circuit for generating a reference signal REF suitable for use in the clock transfer circuit of FIG. 3.
Figure 5:
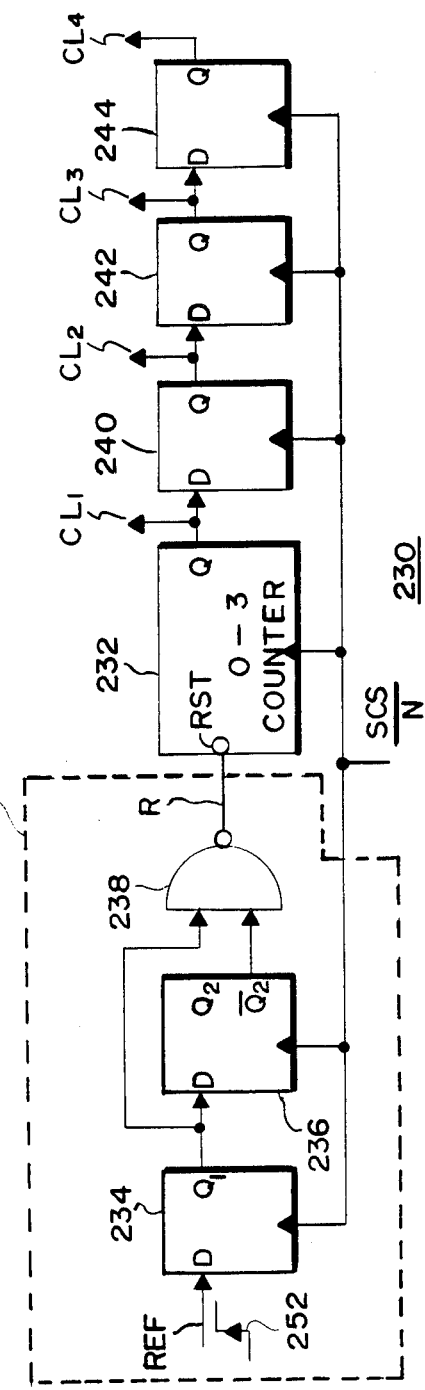
FIG. 5 is a circuit for generating a plurality of clocks for use in the FIG. 3 clock transfer circuit.
Figure 6:
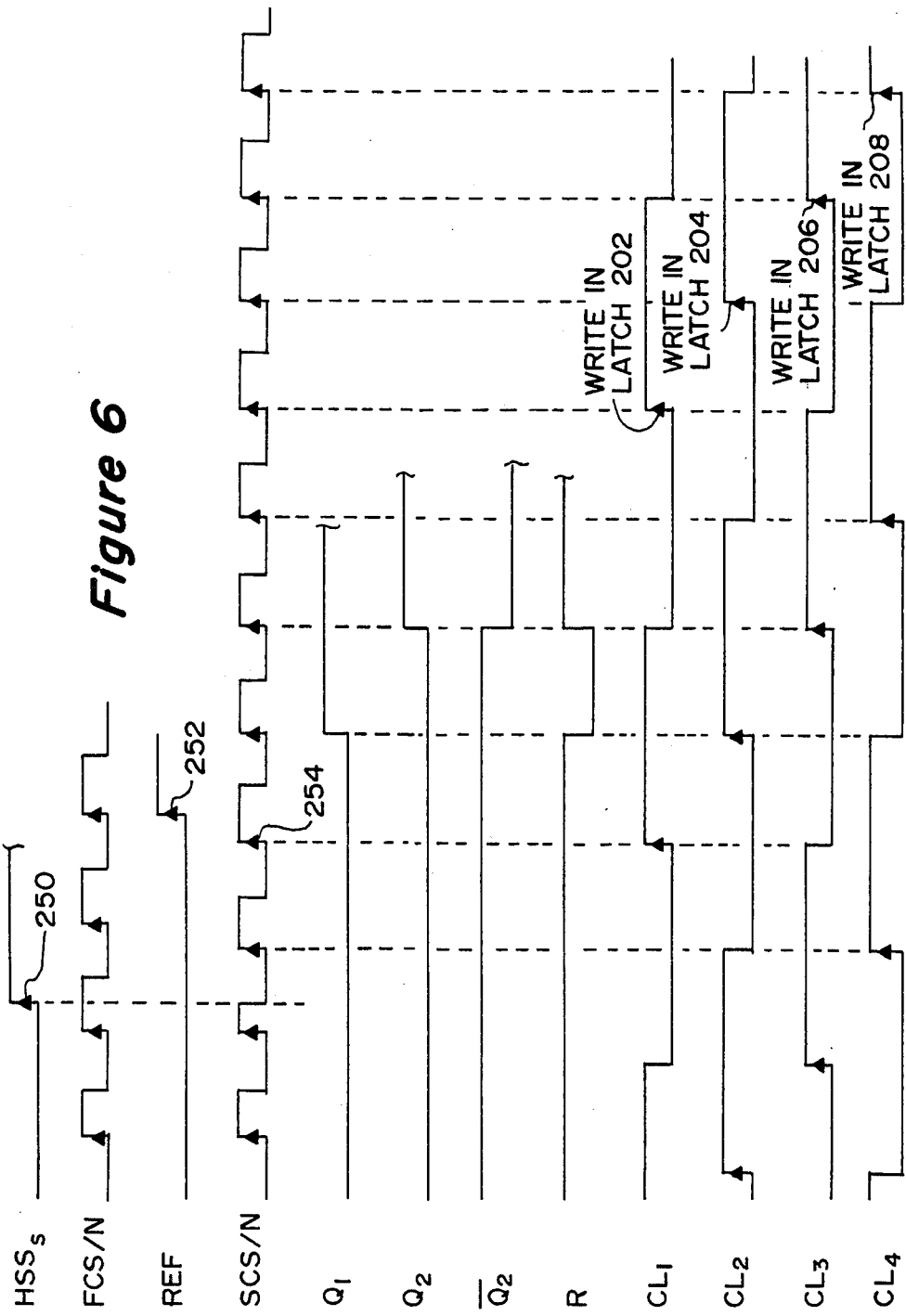
FIGS. 6–8 are waveform diagrams useful for understanding the operation of the clock transfer circuit of FIG. 3.
Figure 7:
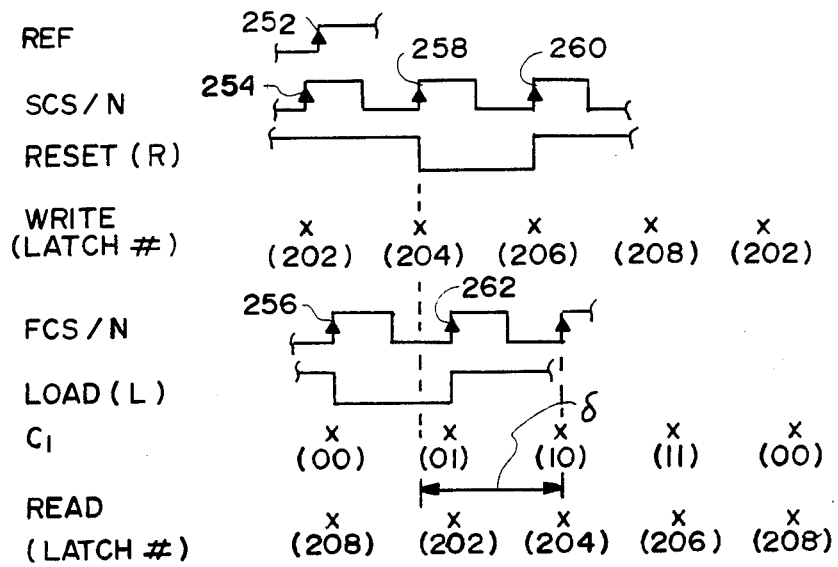
Figure 8:
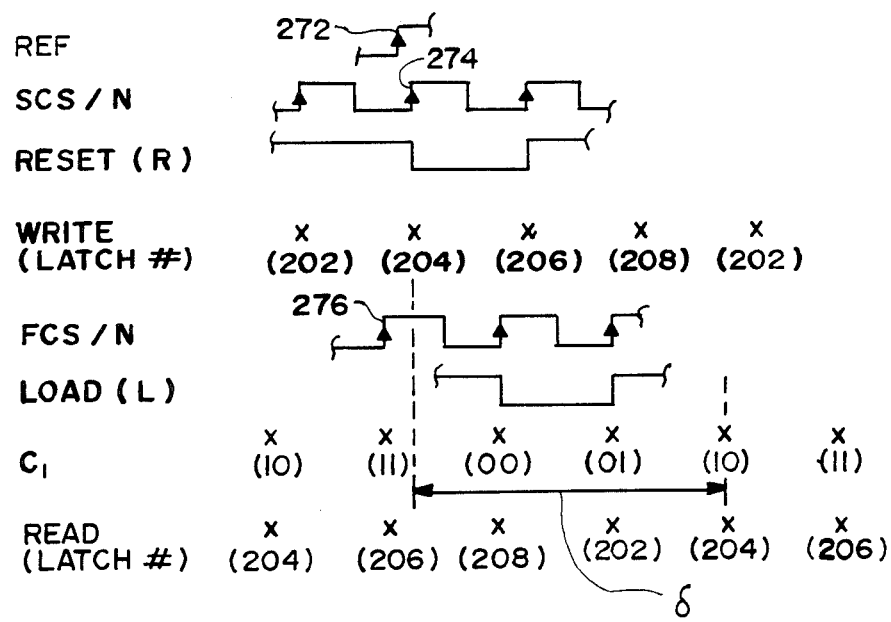

The clock transfer circuit 124 will now be described with the help of FIGS. 3–8. FIG. 3 shows the clock transfer circuit 124 in the block diagram form. FIG. 4 illustrates a reference signal generating circuit. FIG. 5 depicts an arrangement for generating a plurality of clocks for use in the FIG. 3 clock transfer circuit 124. FIGS. 6–8 are timing diagrams useful in understanding the clock transfer circuit 124.

An important feature of the FIG. 3 clock transfer circuit 124 is that the arrangement provides sufficient time for the data to change before it is read out regardless of the relative phase of the skew-shifted clock signal SCS relative to the phase of the line-locked clock signal FCS.

In FIG. 3, successive samples occurring synchronously with the skew-shifted clock signal SCS and at the SCS/N rate, are clocked into an input latch 200 by the respective rising edges of the SCS/N clock signal. The output of the input latch 200 is applied to a plurality of 4 interim latches 202, 204, 206 and 208, which are clocked by the respective clock signals $CL_1$, $CL_2$, $CL_3$ and $CL_4$. In the manner shown in FIG. 6, the clock signals $CL_1$, $CL_2$, $CL_3$ and $CL_4$ occur synchronously with the skew-shifted clock signal SCS, have a frequency which is one fourth the frequency of the SCS/N clock signal, and have phases which are successively shifted by an amount equal to one clock period of the SCS/N clock signal.

A 4-input mux 210, coupled to receive the outputs of the four interim latches 202–208 and responsive to a 2-bit control signal $C_1$, applies the output of one of the four interim latches to an output latch 212. The latch 212, responsive to the FCS/N clock signal, provides a stream of digital samples occurring synchronously with the line-locked clock signal FCS and at the FCS/N rate.

The four clock signals $CL_1$–$CL_4$ and the control signal $C_1$ are generated in response to a reference signal REF, which is, in turn, derived by delaying the horizontal sync component $HSS_S$ of the secondary video signal SVS by at least one clock period. As previously noted, the phase of the skew-shifted clock signal SCS is changed once every horizontal line in response to the $HSS_S$ signal. The delay of one clock period ensures that the rising edge 252 of the reference signal REF occurs after the transition in the phase of skew-corrected clock signal SCS is completed.

To this end, the $HSS_S$ signal is applied to the data input of a D-type flip-flop 280 as shown in FIG. 4. The output Q of the first flip-flop 280 is applied to the data input of a second D-type flip-flop 282. Although the flip-flops 280 and 282 may be clocked by either one of the two reduced-rate clock signals FCS/N and SCS/N, they are clocked by the FCS/N signal in the embodiment shown in FIG. 4. The reference signal REF is available at the Q output of the second flip-flop 282. The rising edge 252 of the reference signal REF is delayed by at least one clock period from the rising edge 250 of the horizontal sync component $HSS_S$ of the secondary video signal SVS in the manner shown in FIG. 6.

The four clock signals $CL_1$–$CL_4$ are generated by a circuit 230 shown in FIG. 5. It includes a synchronous 0–3 counter 232, which is reset to 00 in response to the reference signal REF, and which is clocked by the SCS/N clock signal. As shown in FIG. 6, the reset signal R goes low for one period of the SCS/N clock signal in response to the rising edge 250 of the horizontal sync signal $HSS_S$. To this end, the apparatus 230 includes a pair of flip-flops 234, 236 and a NAND gate 238. The output $Q_1$ of the first flip-flop 234 is applied to a first input of the NAND gate 238 and to the D input of the second flip-flop 236. The $Q_2$ output of the second flip-flop 236 is coupled to the second input of the NAND gate 238. The output R of the NAND gate 238 is applied to the reset terminal of the synchronous counter 232.

The counter 232, in response to the SCS/N clock signal, generates the first clock signal $CL_1$, which is the MSB of a 2-bit count. A plurality of cascade-connected flip-flops 240, 242 and 244 coupled to the counter 232 respectively provide the phase-shifted, second, third and fourth clock signals $CL_2$, $CL_3$ and $CL_4$ with the timing shown in FIG. 6.

The 2-bit control signal $C_1$ is generated by a second 0-to-3 synchronous counter 214, which is loaded with a starting count (e.g., 01) in response to the rising edge 250 of the horizontal sync signal $HSS_S$, and which is clocked by the FCS/N clock signal. A circuit 220 used for generating a signal L that is applied to the counter 214 to load the starting address is similar to the reset signal generating circuit 246 in FIG. 5.

The circuit 220 includes a pair of flip-flops 224, 226 and a NAND gate 228. The flip-flops 224 and 226 are clocked by the FCS/N clock signal. The waveforms for the load signal generating circuit 220 are similar to the FIG. 6 waveforms for the reset signal generating circuit 246 of FIG. 5.

Once the starting address is loaded into the synchronous counter 214 in response to the horizontal sync signal $HSS_S$, the counter advances the address bits applied to the mux 210 once every pulse of the FCS/N clock signal until the maximum count (i.e., 11) is reached. The address bits are then reset (i.e., 00) and counting is continued (i.e., 01, 10, 11, 00, 01 ...). As the address bits (i.e., control signal C1) applied to the multiplexor 210 are stepped through the sequence of numbers 00, 01, 10, 11 ..., the outputs of latches 202, 204, 206, 208 ... are successively applied to the output latch 212.

The advantages of the FIG. 3 clock transfer circuit 124 are two-fold:

Because the interim latches 202 ... 208 are clocked by the clock signals $CL_1$ ... $CL_4$ which have a period equal to 4 times the clock period, the data is stable for 4 clock periods once it is clocked into the interim latches, and The system ensures sufficient time (i.e., at least one clock period) between the instants the data is clocked into and clocked out of the interim latches 202-208 for reasons explained below in conjunction with FIGS. 7 and 8.

In the FIG. 7 example, the rising edge 254 of the SCS/N clock signal occurs just before the rising edge 252 of the reference signal REF, which, in turn, occurs just prior to the rising edge 256 of the FCS/N clock signal. The reset pulse R that resets the clock signal generating circuit 230 (and controls the writing of the data into the interim latches 202-208) extends between the rising edges 258 and 260 of the SCS/N clock signal. The load pulse L that loads the starting address (01) in the counter 214 (and controls the reading of the data from the interim latches 202-208) extends between the rising edges 256 and 262 of the FCS/N clock signal.

The points in time at which the data is written into and read from the respective interim latches 202-208 are shown in FIG. 7 by cross marks with the associated latch numbers given in parenthesis next to them. It is seen that there is a time lapse (δ) of about one clock period between the instant the data is clocked in and the instant when the data is clocked out, which allows adequate data set-up time.

FIG. 8 depicts the other extreme situation where the rising edge 274 of the SCS/N clock signal occurs just after the rising edge 272 of the reference signal REF, which, in turn, occurs just after the rising edqe 276 of the FCS/N clock signal. The reset and load signals R and L occur as shown. It is noted that there is a time duration ($\delta$) of about two clock periods between the time the data is latched in and the time it is latched out.

As described above, the signal processing circuitry used for generating special effects (e.g., pix-in-pix, TV guide, Fly's eye, zoom, etc.) employs two clocks: (1) a system clock that is locked to the display, and (2) a skew-shifted clock that is locked to the horizontal sync component of the auxiliary video signal, and which has the same period as the system clock signal. The circuitry utilized for implementing the two clock system—the skew or phase shifter and the clock transfer circuit—is simple, reliable and relatively inexpensive.

Although the embodiment described herein employs a system clock FCS that is line locked (i.e., phase and frequency locked) to the horizontal sync component $HSS_D$ of the primary video signal PVS and a second clock SCS that is phase locked to the horizontal synchronizing component $HSS_S$ of the secondary video signal SVS, it is possible to reverse the relationship between the two clocks. For example, the second clock SCS may be line locked to the horizontal sync component $HSS_S$ of the secondary video signal SVS and the system clock FCS may be phase locked to the horizontal sync component $HSS_D$ of the primary video signal PVS.

What is claimed is:

1. A television (TV) signal processing system for use with a display device having a screen and being responsive to a periodic raster synchronizing component; said system comprising:
   a source of a-video signal for generating a picture on said screen; said video signal including a periodic picture synchronizing component;
   means for generating a first clock signal;
   means for sychronizing the phase of said first clock signal with the phase of said periodic raster synchronizing component;
   means coupled to receive said first clock signal and responsive to said periodic picture synchronizing component of said video signal for generating a second clock signal (1) having its phase adjusted once every period of said periodic picture synchronizing component to be in phase alignment therewith, and (2) having the same period as said first clock signal between successive phase alignments;
   means coupled to receive said video signal and responsive to said second clock signal for developing a stream of signal samples occurring synchronously with said second clock signal;
   clock transfer means responsive to said first and second clock signals for translating said stream of signal samples occurring synchronously with said second clock signal into a stream of signal samples occurring synchronously with said first clock signal; and
   memory means coupled to said clock transfer means and responsive to said first clock signal for storing said signal samples representative of said picture and for providing, at an output port thereof, said stored signal samples synchronously with said first clock signal.

2. The sytem defined in claim 1 wherein said first clock signal is free running and wherein said periodic raster synchronizing signal is derived from said free running first clock signal so that it is in phase alignment therewith.

3. The system defined in claim 1 for producing a small picture that is reduced both in width and height by a factor of N, where N is an integer; wherein said system further includes means for dividing said first and second clock signals by said reduction factor N to generate respective, first and second reduced-frequency clock signals; wherein said sample developing means and said clock transfer means are responsive to said reduced-frequency clock signals.

4. The system defined in claim 1 further including:
   a source of a primary video signal for generating a full size primary picture on said screen having said first-mentioned picture displayed as a reduced-size inset therein; said primary video signal including a periodic picture synchronizing component; and
   means responsive to said periodic picture synchronizing component of said primary video signal for generating said periodic raster synchronizing component;
   wherein said phase synchronizing means locks the phase of said first clock signal with the phase of said periodic picture synchronizing component of said primary video signal.

5. The system defined in claim 4 wherein said phase synchronizing means additionally serves to lock the frequency of said first clock signal to a harmonic of the frequency of said periodic picture synchronizing component of said primary video signal.

6. The system defined in claim 5 wherein the frequency of said first clock signal is equal to 1374 times the frequency of said synchronizing component of said primary video signal.

7. A picture-in-picture television (TV) receiver including a display device; said display device having a screen for displaying images thereon and further having means responsive to a raster synchronizing component for generating a raster on said screen; said TV receiver comprising:
   a source of a first video signal for generating a main picture on said display screen; said first video signal having periodic horizontal and vertical picture synchronizing components for timing said raster generating means;
   a source of a second video signal for generating an inset image on said screen that is reduced both in height and width by an image reduction factor N with respect to said main picture; said second video signal including periodic horizontal and vertical picture synchronizing components;
   means for generating a first clock signal FCS having its phase locked to the phase of said horizontal picture synchronizing component of said first video signal;
   means coupled to receive said first clock signal FCS and responsive to said horizontal picture synchronizing component of said second video signal for generating a second clock signal SCS (1) having its phase adjusted once every period of said horizontal synchronizing component of said second video signal to be in phase alignment therewith, and (2) having the same period as said first clock signal FCS between successive phase alignments;

means coupled to receive said first clock signal FCS and responsive to said image reduction factor N for generating a first reduced-rate clock signal FCS/N;

means coupled to receive said second clock signal SCS and responsive to said image reduction factor N for generating a second reduced-rate clock signal SCS/N;

an analog-to-digital (A/D) converter coupled to receive said second video signal and responsive to said reduced-rate second clock signal SCS/N for developing a stream of digital samples occurring synchronously therewith;

clock transfer means responsive to said reduced-rate clock signals FCS/N and SCS/N for translating said stream of digital samples occurring synchronously with said reduced-rate second clock signal SCS/N to a stream of digital samples occurring synchronously with said reduced-rate first clock signal FCS/N;

memory means coupled to said clock transfer means (1) for receiving said digital samples representative of said inset image at said first reduced-rate FCS/N, and (2) for supplying, at an output port thereof, stored digital samples representative of said inset image at said first clock rate FCS; and switching means having inputs coupled to receive said first video signal and said inset image signal for applying to said image display device an appropriate one of said input signals to produce a reduced size inset image within a full size main image on said display screen.

8. The TV receiver defined in claim 7 wherein said first clock signal generating means also serves to lock the frequency of said first clock signal FCS to a harmonic of the frequency of said horizontal synchronizing component of said first video signal.

9. A television (TV) signal processing system for use with a display device; said display device having a screen for displaying images thereon and further having means responsive to a raster synchronizing component for generating a raster on said screen; said system comprising:

a source of a video signal for generating a picture on said screen; said video signal including a video signal synchronizing component;

means for generating a first clock signal;

means for locking the phase and frequency of said first clock signal with the phase and a harmonic of the frequency of said synchronizing component of said video signal;

means coupled to receive said first clock signal and responsive to said raster synchronizing component for generating a second clock signal (1) having its phase adjusted once every period of said raster synchronizing component to be in phase alignment therewith; and (2) having the same period as said first clock signal between successive phase alignments;

an analog-to-digital (A/D) converter coupled to receive said video signal and responsive to said first clock signal for developing a stream of digital samples occurring synchronously therewith;

clock transfer means responsive to said clock signals for translating said stream of digital samples occurring synchronously with said first clock signal into a stream of digital samples occurring synchronously with said second clock signal; and memory means coupled to said clock transfer means and responsive to said second clock signal for storing said digital samples representative of said picture and for providing, at an output port thereof, said stored digital samples synchronously with said second clock signal.

10. A television (TV) signal processing system responsive to a periodic raster synchronizing component comprising:

a source of a video signal including a periodic picture synchronizing component;

means for generating a first clock signal;

means for synchronizing the phase of said first clock signal with the phase of said periodic raster synchronizing component;

means coupled to receive said first clock signal and responsive to said periodic picture synchronizing component of said video signal for generating a second clock signal (1) having its phase adjusted once every period of said periodic picture synchronizing component to be in phase alignment therewith, and (2) having the same period as said first clock signal between successive phase alignments;

means coupled to receive said video signal and responsive to said second clock signal for developing samples occurring synchronously with said second clock signal;

clock transfer means responsive to said first and second clock signals for translating said samples occurring synchronously with said second clock signal into samples occurring synchronously with said first clock signal; and means coupled to said clock transfer means and responsive to said first clock signal for storing said picture representative samples and for providing said stored samples synchronously with said first clock signal.

* * * * *